(12) United States Patent   (10) Patent No.: US 12,418,951 B2
Asakura                          (45) Date of Patent: Sep. 16, 2025

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND NON-TRANSITORY COMPUTER-READABLE RECORDING MEDIUM STORING APPLICATION PROGRAM INCLUDING COMPUTER-READABLE INSTRUCTIONS FOR TERMINAL DEVICE

(71) Applicant: BROTHER KOGYO KABUSHIKI KAISHA, Nagoya (JP)

(72) Inventor: Hirotaka Asakura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 369 days.

(21) Appl. No.: 18/184,782

(22) Filed: Mar. 16, 2023

(65) Prior Publication Data
US 2023/0300932 A1    Sep. 21, 2023

(30) Foreign Application Priority Data
Mar. 18, 2022  (JP) ................................ 2022-044588

(51) Int. Cl.
  *H04W 76/18*   (2018.01)
  *H04W 12/062*  (2021.01)
  *H04W 84/12*   (2009.01)

(52) U.S. Cl.
  CPC ......... *H04W 76/18* (2018.02); *H04W 12/062* (2021.01); *H04W 84/12* (2013.01)

(58) Field of Classification Search
  CPC .... H04W 76/18; H04W 12/062; H04W 84/12
  (Continued)

(56) References Cited

U.S. PATENT DOCUMENTS 11,546,755 B2 *  1/2023  Jiang ..................... H04L 9/0822
12,041,049 B1 *  7/2024  Stevens .............. H04L 63/0876
(Continued)

FOREIGN PATENT DOCUMENTS

JP    2020-108118 A    7/2020
JP    7279367 B2 *     5/2023  ........... H04L 9/0841
(Continued)

OTHER PUBLICATIONS

Wi-Fi Easy Connect Specification Version 2.0, Wi-Fil Alliance, 2020, Cited in the present application.
(Continued)

*Primary Examiner* — Mahendra R Patel
(74) *Attorney, Agent, or Firm* — Merchant & Gould P.C.

(57) ABSTRACT

A communication device may: execute a Device Provisioning Protocol (DPP) process according to the DPP of a Wi-Fi standard, wherein the DPP process includes: receiving an authentication request in which a bootstrapping key of the communication device is used from a terminal device; in a case where the authentication request is received from the terminal device, sending an authentication response to the terminal device; and after the authentication response has been sent to the terminal device, receiving first connection information from the terminal device, and in a case where the first Wi-Fi connection between the communication device and the first access point is established, the communication device may send confirmation information to the terminal device, wherein the confirmation information is used by the terminal device for executing connectivity confirmation.

20 Claims, 11 Drawing Sheets

(58) Field of Classification Search
USPC .......................................................... 370/338
See application file for complete search history.

(56) References Cited

U.S. PATENT DOCUMENTS

| | | | | |
|---|---|---|---|---|
| 2017/0257819 | A1* | 9/2017 | McCann | H04L 67/56 |
| 2019/0303071 | A1* | 10/2019 | Tsuji | G06F 3/1222 |
| 2019/0306707 | A1* | 10/2019 | Shibata | H04W 12/0431 |
| 2019/0306710 | A1* | 10/2019 | Cammarota | H04W 12/06 |
| 2020/0104081 | A1* | 4/2020 | Miyake | G06K 7/10722 |
| 2020/0214059 | A1* | 7/2020 | Suzuki | H04W 76/14 |
| 2020/0226258 | A1* | 7/2020 | Nix | H04W 4/60 |
| 2021/0243825 | A1* | 8/2021 | Takada | H04W 76/32 |
| 2021/0385778 | A1* | 12/2021 | Ahn | H04W 60/00 |

FOREIGN PATENT DOCUMENTS

| | | | | |
|---|---|---|---|---|
| WO | WO-2018203512 A1 * | 11/2018 | | B62B 5/0096 |
| WO | WO-2019245190 A1 * | 12/2019 | | |
| WO | WO-2020043809 A1 * | 3/2020 | | H04L 63/0823 |

OTHER PUBLICATIONS

Wi-Fi Direct Specifation Version 1.9, Wi-Wi Alliance, 2021, Cited in the present application.

* cited by examiner

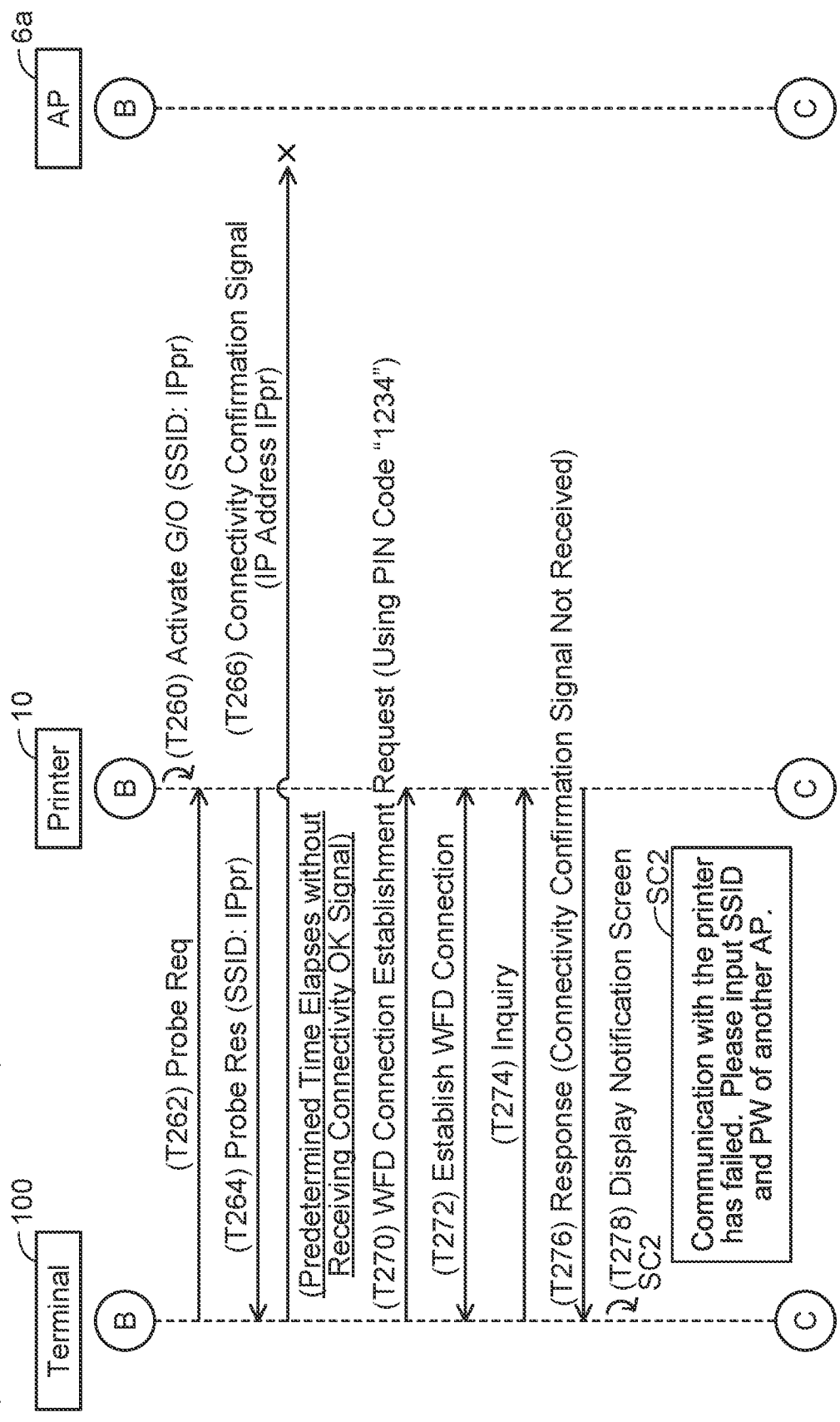

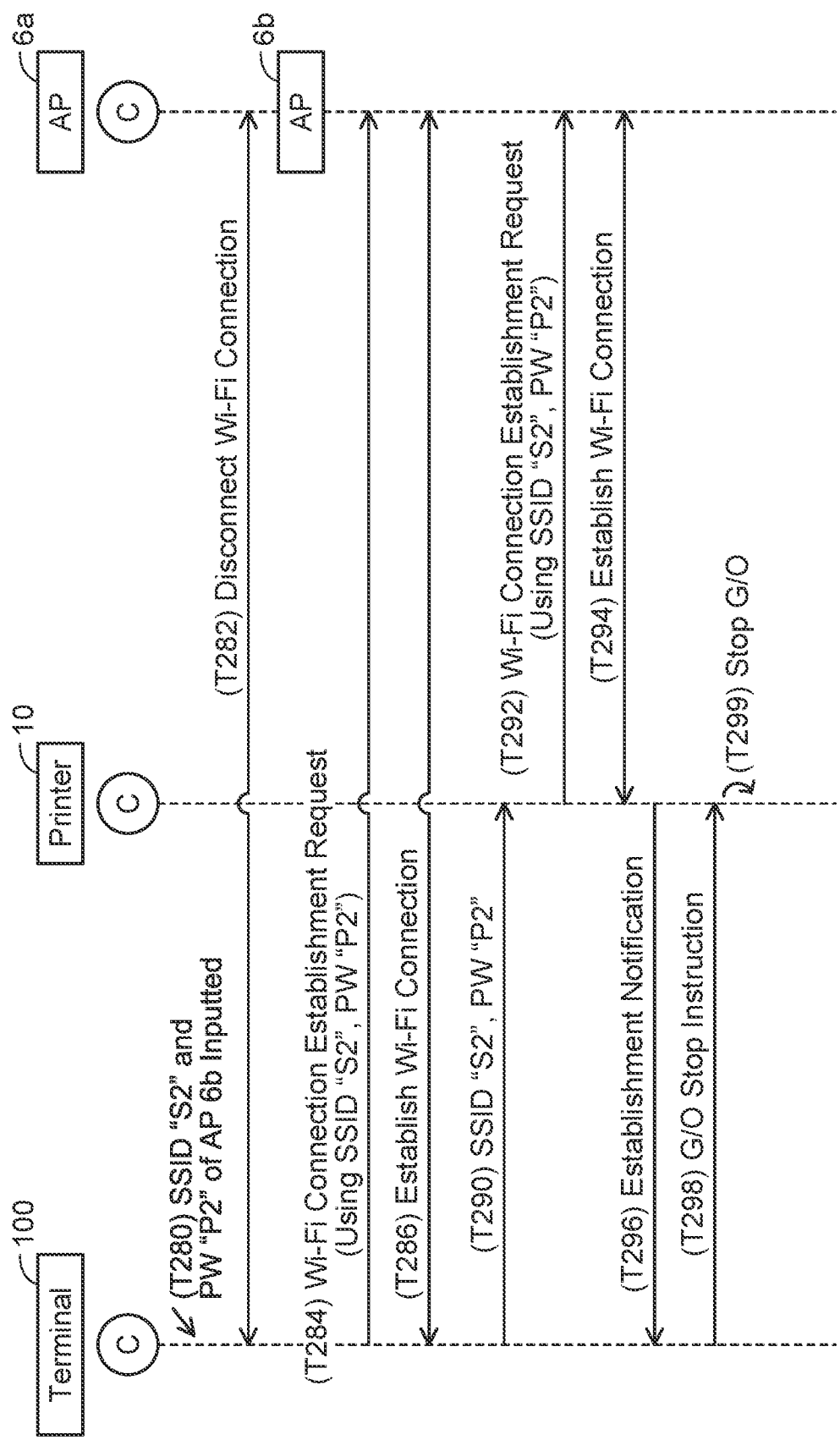

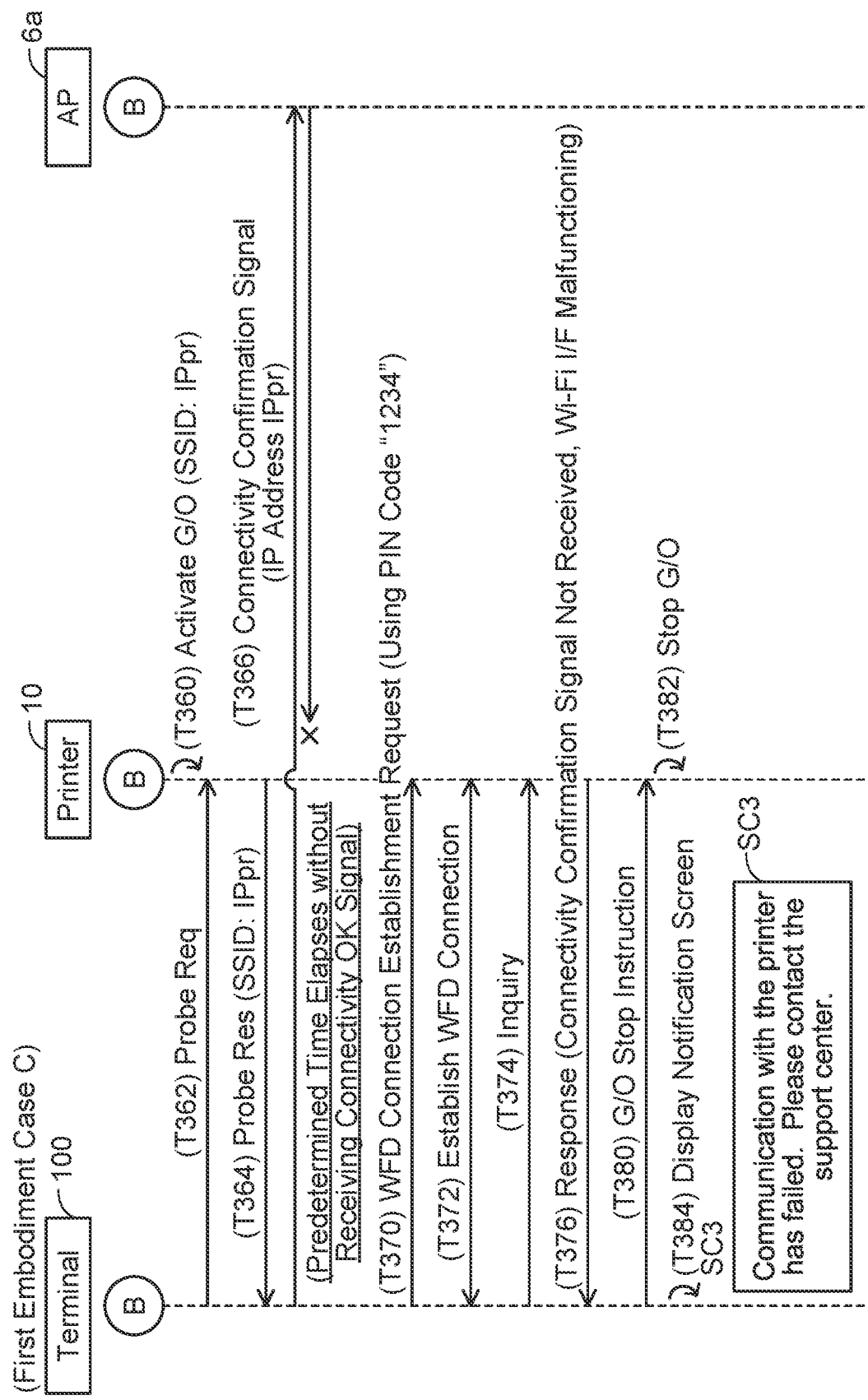

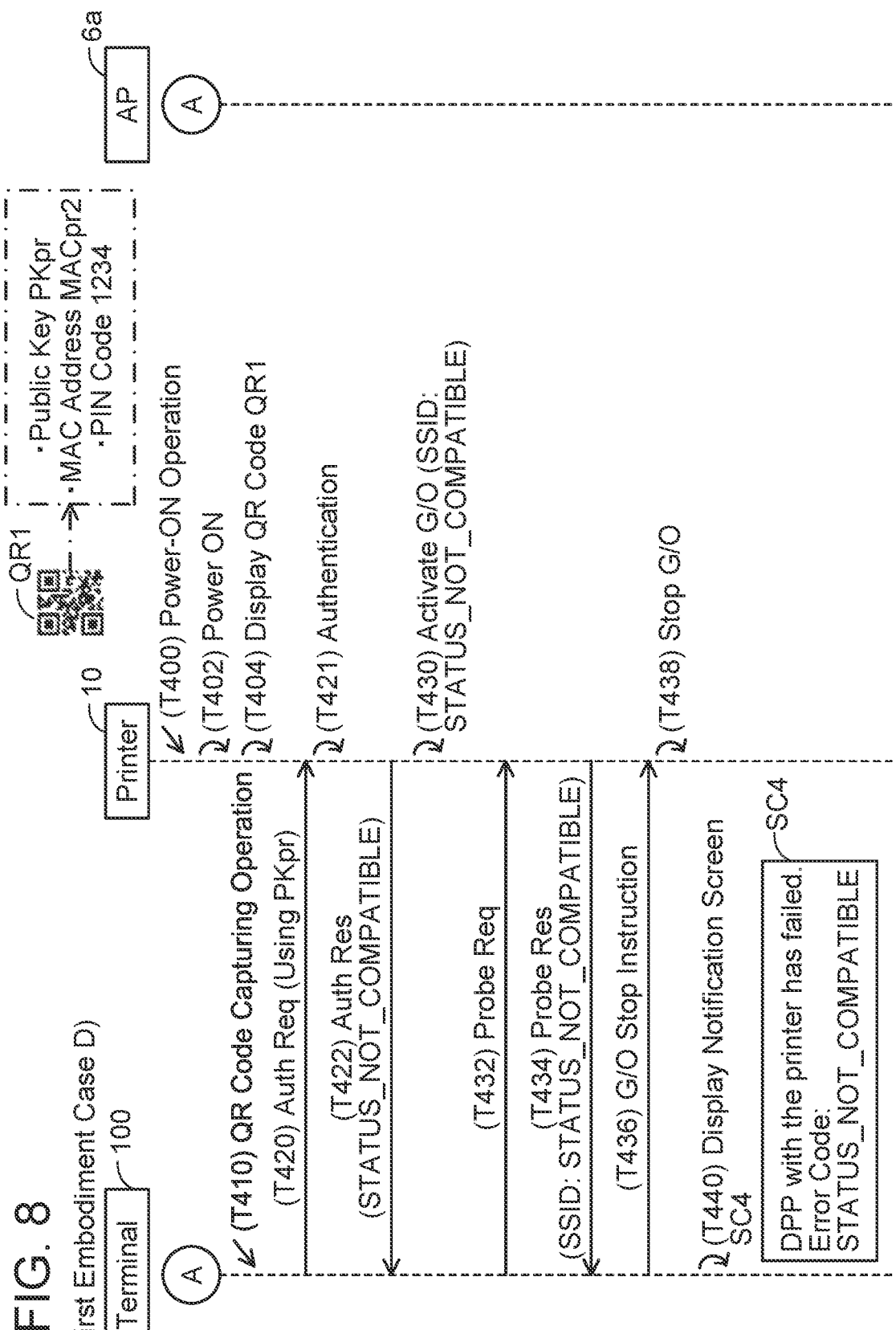

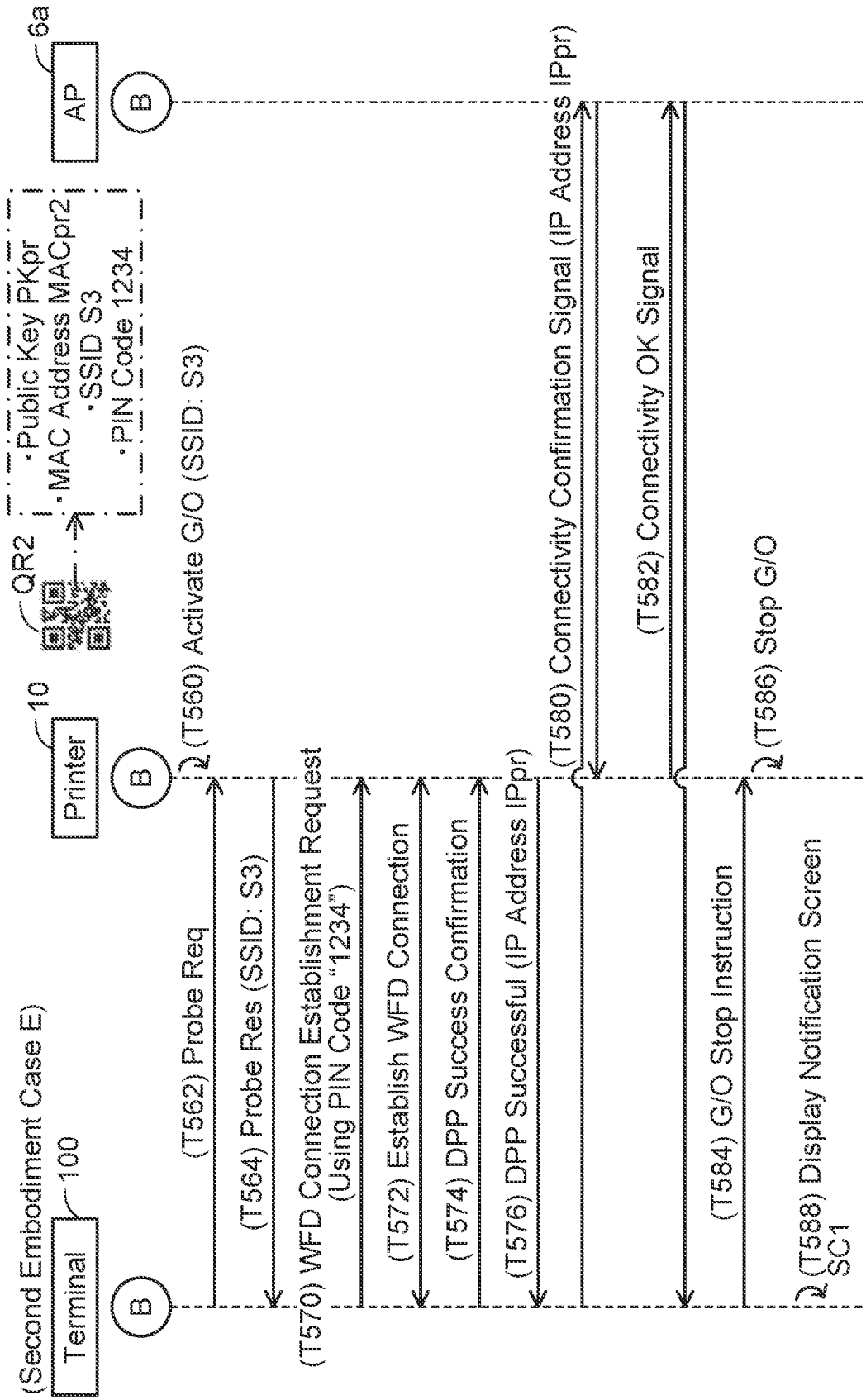

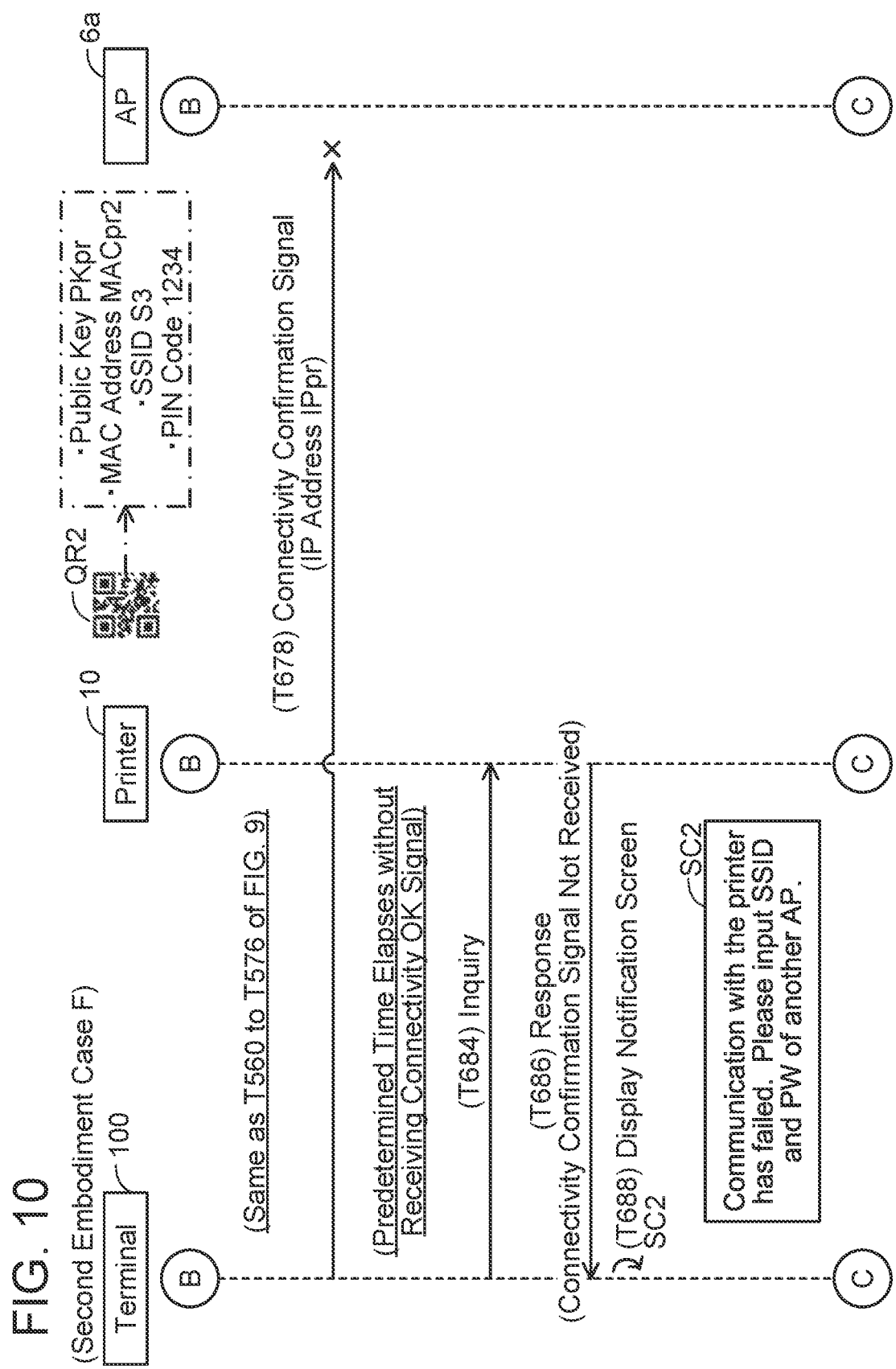

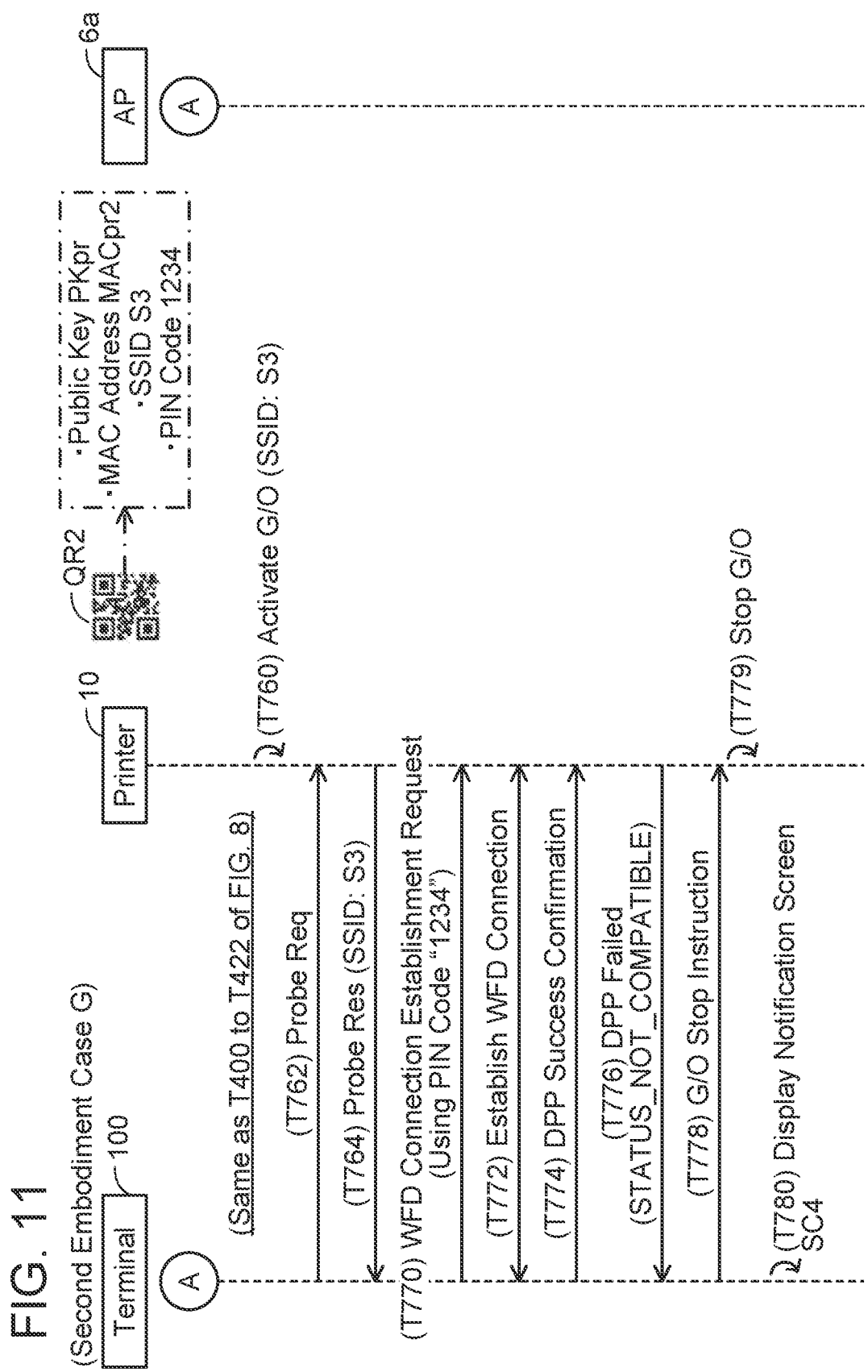

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND NON-TRANSITORY COMPUTER-READABLE RECORDING MEDIUM STORING APPLICATION PROGRAM INCLUDING COMPUTER-READABLE INSTRUCTIONS FOR TERMINAL DEVICE

REFERENCE TO RELATED APPLICATION

This application claims priority from Japanese Patent Application No. 2022-044588 filed on Mar. 18, 2022. The entire content of the priority application is incorporated herein by reference.

BACKGROUND ART

A technique to establish a Wi-Fi connection between a device and an access point by using a terminal device according to the Device Provisioning Protocol (DDP) of the Wi-Fi standard is known. In particular, this technique describes a technique to notify the terminal device of a result of execution of the DPP.

DESCRIPTION

The present disclosure provides a technique to enhance user convenience when a Wi-Fi connection is to be established according to the DPP.

A communication device is disclosed herein. The communication device may comprise: a Wi-Fi interface configured to execute Wi-Fi communication according to a Wi-Fi standard; and a controller. The controller may be configured to: execute a Device Provisioning Protocol (DPP) process according to the DPP of the Wi-Fi standard, wherein the DPP process comprises: receiving an authentication request in which a bootstrapping key of the communication device is used from a terminal device via the Wi-Fi interface; in a case where the authentication request is received from the terminal device, sending an authentication response to the terminal device via the Wi-Fi interface; and after the authentication response has been sent to the terminal device, receiving first connection information from the terminal device via the Wi-Fi interface, wherein the first connection information is used by the communication device for establishing a first Wi-Fi connection between the communication device and a first access point via the Wi-Fi interface, and in a case where the first Wi-Fi connection between the communication device and the first access point is established, send confirmation information to the terminal device via the Wi-Fi interface, wherein the confirmation information is used by the terminal device for executing connectivity confirmation to confirm whether the Wi-Fi communication between the communication device and the terminal device via the first access point is executable.

According to the above configuration, the communication device sends the confirmation information to the terminal device in the case where the first Wi-Fi connection between the communication device and the first access point is established. Consequently, the terminal device can execute connectivity confirmation by using the confirmation information. Thus, user convenience is enhanced.

A non-transitory computer-readable recording medium storing an application program including computer-readable instructions for a terminal device is also disclosed herein. The terminal device may comprise: a Wi-Fi interface configured to execute Wi-Fi communication according to a Wi-Fi standard; and a processer. The computer-readable instructions, when executed by the processor, may cause the terminal device to: execute a Device Provisioning Protocol (DPP) process according to the DPP of the Wi-Fi standard, wherein the DPP process comprises: sending an authentication request in which a bootstrapping key of a communication device is used to the communication device via the Wi-Fi interface; in a case where the authentication request is sent to the communication device, receiving an authentication response from the communication device via the Wi-Fi interface; and after the authentication response has been received from the communication device, sending connection information to the communication device via the Wi-Fi interface, wherein the connection information is used by the communication device for establishing a first Wi-Fi connection between the communication device and an access point via the Wi-Fi interface, in a case where the first Wi-Fi connection between the communication device and the access point is established, receive confirmation information from the communication device via the Wi-Fi interface, wherein the confirmation information is used by the terminal device for executing connectivity confirmation to confirm whether the Wi-Fi communication between the communication device and the terminal device via the access point is executable; and in a case where the confirmation information is received from the communication device, execute the connectivity confirmation by using the confirmation information.

According to the above configuration, the terminal device receives the confirmation information from the communication device in the case where the first Wi-Fi connection between the communication device and the access point is established. Consequently, the terminal device can execute the connectivity confirmation by using the confirmation information. Thus, the user convenience is enhanced.

A non-transitory computer-readable recording medium storing computer-readable instructions for the aforementioned communication device and a method implemented by the communication device are also novel and useful. Further, the terminal device implemented by this application program and a method executed by this terminal device are also novel and useful. Moreover, a communication system including the aforementioned communication device and the aforementioned terminal device is also novel and useful.

FIG. 5 is a sequence diagram of Case B.

FIG. 6 is a sequence diagram continued from FIG. 5.

FIG. 7 is a sequence diagram of Case C.

FIG. 8 is a sequence diagram of Case D.

FIG. 9 is a sequence diagram of Case E.

FIG. 10 is a sequence diagram of Case F.

FIG. 11 is a sequence diagram of Case G.

Figure 1:
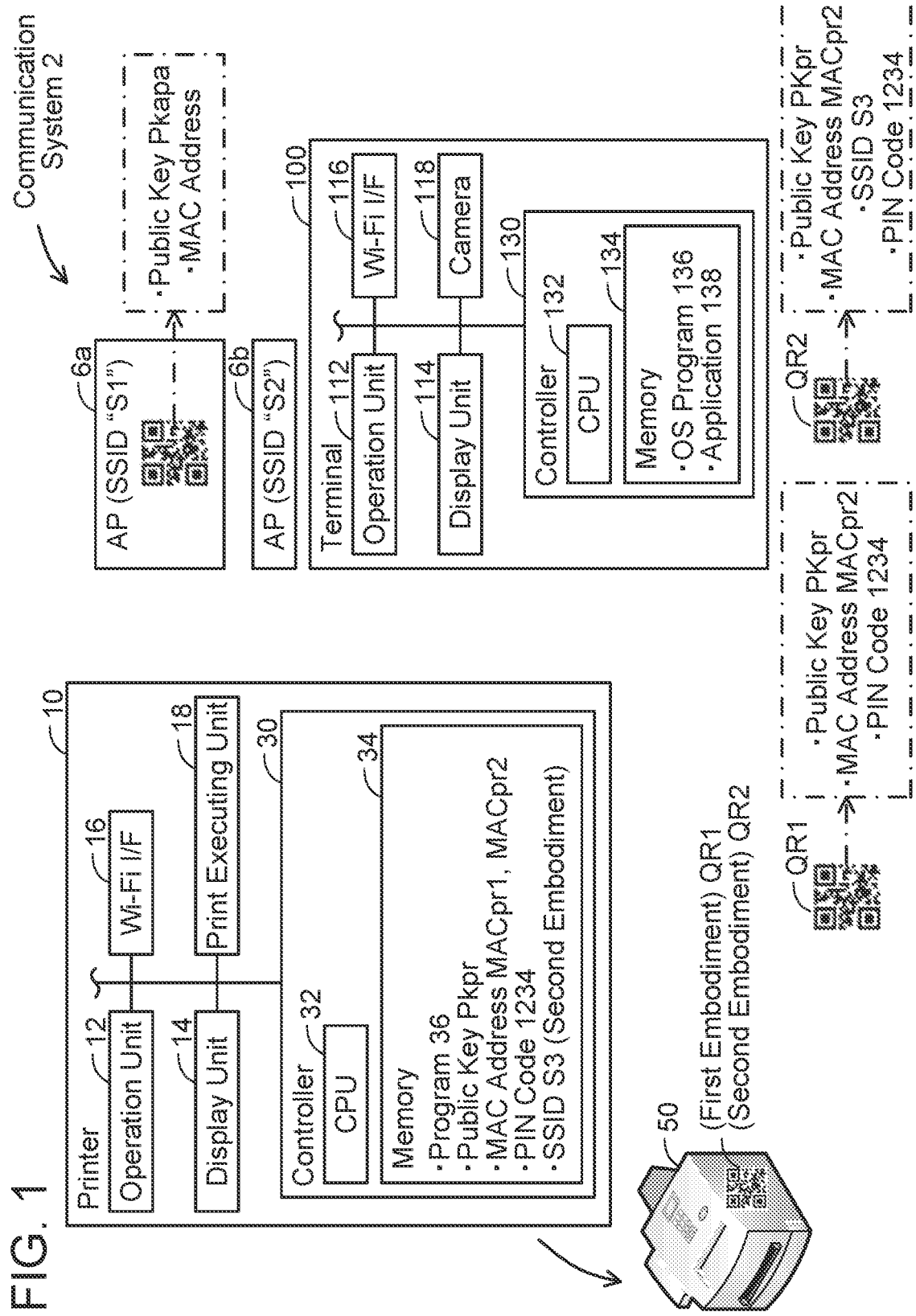
FIG. 1 illustrates a configuration of a communication system.

FIRST EMBODIMENT (Configuration of Communication System 2; FIG. 1)

As illustrated in FIG. 1, a communication system 2 includes two access points (AP) 6a, 6b, a printer 10 and a terminal 100. The present embodiment contemplates a situation in which a wireless connection according to the Wi-Fi standard (hereafter referred to as "Wi-Fi connection") is to be established between the printer 10 and an AP (e.g., the AP 6a) by using the terminal 100.

When a Wi-Fi connection between the terminal 100 and the AP 6a is established and a Wi-Fi connection between the printer 10 and the AP 6a is established, the terminal 100 and the printer 10 can communicate with each other via the AP 6a. However, there is a case where the terminal 100 and the printer 10 cannot communicate via the AP 6a even when the Wi-Fi connection between the devices 10, 100 and the AP 6a is established, due to, for example, weak radio environment around the AP 6a. To address this, in the present embodiment, connectivity confirmation to confirm whether the communication between the terminal 100 and the printer 10 via the AP 6a is executable is executed.

(Configuration of Printer 10)

The printer 10 is a peripheral device configured to execute a print function (e.g., a peripheral device of the terminal 100). In a modification, the printer 10 may be a multi-function device configured to execute a scan function, a facsimile function and the like as well as the print function. The printer 10 includes an operation unit 12, a display unit 14, a Wi-Fi interface 16, a print executing unit 18 and a controller 30. The units 12 to 30 are connected to bus lines (reference sign omitted). Hereafter, the interface will be referred to as "I/F".

The operation unit 12 includes a plurality of keys. The user can input various instructions to the printer 10 by operating the operation unit 12. The display unit 14 is a display to display various kinds of information. The display unit 14 is a touch screen, and also functions as the operation unit 12. The print executing unit 18 comprises a printing mechanism of an inkjet scheme, a laser scheme, or the like.

The Wi-Fi I/F 16 is a wireless I/F to execute Wi-Fi communication according to the Wi-Fi standard. The Wi-Fi standard is a wireless communication standard to execute wireless communication according to, for example, 802.11 standard or its compliant standards (e.g., 802.11a, 11b, 11g, 11n, 11ac) of The Institute of Electrical and Electronics Engineers, Inc. (IEEE). The Wi-Fi I/F 16 in particular supports the Device Provisioning Protocol (DPP) created by the Wi-Fi alliance. Details of the DPP is described in the standard "Wi-Fi Easy Connect Specification Version 2.0" created by the Wi-Fi alliance.

The Wi-Fi I/F 16 further supports Wi-Fi Direct (WFD) created by the Wi-Fi Alliance. Wi-Fi Direct is a registered trademark of Wi-Fi Alliance. Details of the WFD is described in the standard "Wi-Fi Direct Specification Version 1.9" created by the Wi-Fi alliance. In the WFD, a Group Owner state (hereafter referred to as "G/O state") is defined. The G/O state is a state to operate as a parent station in a wireless connection established according to the WFD. Hereafter, the Wi-Fi connection established according to the WFD will be referred to as a "WFD connection".

The printer 10 can establish a Wi-Fi connection with the AP 6 according to an ordinary Wi-Fi scheme different from the DPP or the WFD (hereafter this may be referred to as "support the ordinary Wi-Fi scheme"). Specifically, in the ordinary Wi-Fi scheme, the printer 10 can use a Service Set Identifier (SSID) and a password of a wireless network formed by an AP (e.g., the AP 6a) to establish a Wi-Fi connection with this AP. Hereafter, the password will be referred to as "PW".

The Wi-Fi I/F 16 is physically one I/F (i.e., one IC chip). However, two MAC addresses MACpr1 and MACpr2 are assigned to the Wi-Fi I/F 16. The MAC address MACpr1 is a MAC address used for direct communication with a target device (i.e., communication not using another device). The MAC address MACpr2 is a MAC address used for communication with the target device via another device. The MAC address MACpr1 is used in for example the WFD. The MAC address MACpr2 is used in for example the DPP and the ordinary Wi-Fi scheme. Thus, the Wi-Fi I/F 16 may simultaneously execute both the WFD communication in which the MAC address MACpr1 is used and the non-WFD communication in which the MAC address MACpr2 is used. In a modification, the MAC address MACpr1 may be used in the DPP as well as in the WFD. In another modification, the MAC address MACpr1 may be used in a SoftAP scheme instead of the WFD. The SoftAP scheme is a scheme for the printer 10 to operate as a parent station (i.e., SoftAP) of a Wi-Fi network to establish a Wi-Fi connection with another device (e.g., the terminal 100).

The controller 30 includes a CPU 32 and a memory 34. The CPU 32 executes various processes according to a program 36 stored in the memory 34. The memory 34 is configured of a volatile memory, a nonvolatile memory, and the like.

The memory 34 further stores a public key PKpr, the above MAC addresses MACpr1, MACpr2 and a PIN code "1234". Although not illustrated, the memory 34 stores a private key corresponding to the public key PKpr. The public key PKpr and the private key are used when authentication according to the DPP is executed. The PIN code "1234" is authentication information used when the WFD connection with the terminal 100 is established.

A QR Code QR1 obtained by coding the public key PKpr, the MAC address MACpr2 and the PIN code "1234" is adhered to a housing 50 of the printer 10. QR Code is registered trademark of DENSO WAVE INCORPORATED. Although the details will be described later, by the QR Code QR1 being captured, processes according to the DPP are executed between the printer 10 and the terminal 100. In a modification, the QR Code QR1 may not be adhered to the housing 50 of the printer 10. In this case, the printer 10 may be configured to display the QR Code QR1 on the display unit 14 when the printer 10 is powered on or when the printer 10 accepts a predetermined operation or a predetermined signal (e.g., an operation (or a signal) to cause the printer 10 to start a process to establish a Wi-Fi connection). As described above, the QR Code QR1 adhered to the housing 50 of the printer 10 (or the QR Code QR1 displayed on the display unit 14) is obtained by coding the information including the PIN code "1234". Thus, the user can establish the WFD connection between the printer 10 and the terminal 100 by capturing the QR Code QR1.

(Configuration of Terminal 100)

The terminal 100 is a portable terminal device such as a cellphone (e.g., a smartphone), a PDA or a tablet PC. In a modification, the terminal 100 may for example be a desktop PC or a laptop PC. The terminal 100 includes an operation unit 112, a display unit 114, a Wi-Fi I/F 116, a camera 118 and a controller 130. The units 112 to 130 are connected to bus lines (reference sign omitted).

The operation unit 112 is an I/F to input various instructions to the terminal 100. The display unit 114 is a display to display various kinds of information. The display unit 114 is a so-called touch screen and also functions as the operation unit 112. The camera 118 is a device to capture an object. In the present embodiment, the camera 118 is used to capture the QR Code of the AP 6a and the QR Code of the printer 10. The Wi-Fi I/F 116 is similar to the Wi-Fi I/F 16 of the printer 10. In other words, the Wi-Fi I/F 116 supports the DPP, the WFD and the ordinary Wi-Fi scheme.

The controller 130 includes a CPU 132 and a memory 134. The CPU 132 executes various processes according to programs 136, 138 stored in the memory 134. The memory 134 is configured of a volatile memory, a nonvolatile memory, and the like.

An Operating System (OS) program 136 is a program to implement basic operations of the terminal 100. The application 138 is a program to establish a Wi-Fi connection between the terminal 100 and an AP (e.g., the AP 6a) and establish a Wi-Fi connection between the printer 10 and the AP. Hereafter, the OS program and the application will be referred to as "OS" and "app", respectively. The app 138 is installed in the terminal 100 from, for example, a server (not illustrated) on the Internet provided by a vendor of the printer 10 or from a server (not illustrated) on the Internet provided by a vendor of the OS 136.

The app 138 can cause the OS 136 to execute various processes and cause other app(s) to execute various processes via the OS 136 by supplying instructions to the OS 136. Thus, the processes executed by the OS 136 or the other app(s) in response to the instructions from the app 138 can be said as processes implemented by the app 138 (i.e., the app 138 causes the CPU 132 to function as an execution unit to execute these processes.)

(Configurations of APs 6a, 6b)

The AP 6a is not a device in the G/O state of the WFD but is an ordinary AP called a wireless access point or a wireless LAN router. The AP 6a supports the DPP scheme and the ordinary Wi-Fi scheme. The AP 6a relays communication between a pair of devices which belong to a Wi-Fi network in which the AP 6a operates as a parent station. The AP 6a stores an SSID "S1" identifying this Wi-Fi network. The AP 6a supports the DPP.

Although not illustrated, the AP 6a stores a public key PKapa of the AP 6a, a private key corresponding to the pubic key PKapa and a MAC address of a Wi-Fi I/F of the AP 6a (not illustrated). A QR Code obtained by coding information including the public key PKapa and the MAC address of the AP 6a is adhered to a housing of the AP 6a.

The AP 6b has a similar configuration as the AP 6a except that respective pieces of information (e.g., SSID, public key) are different.

Figure 2:
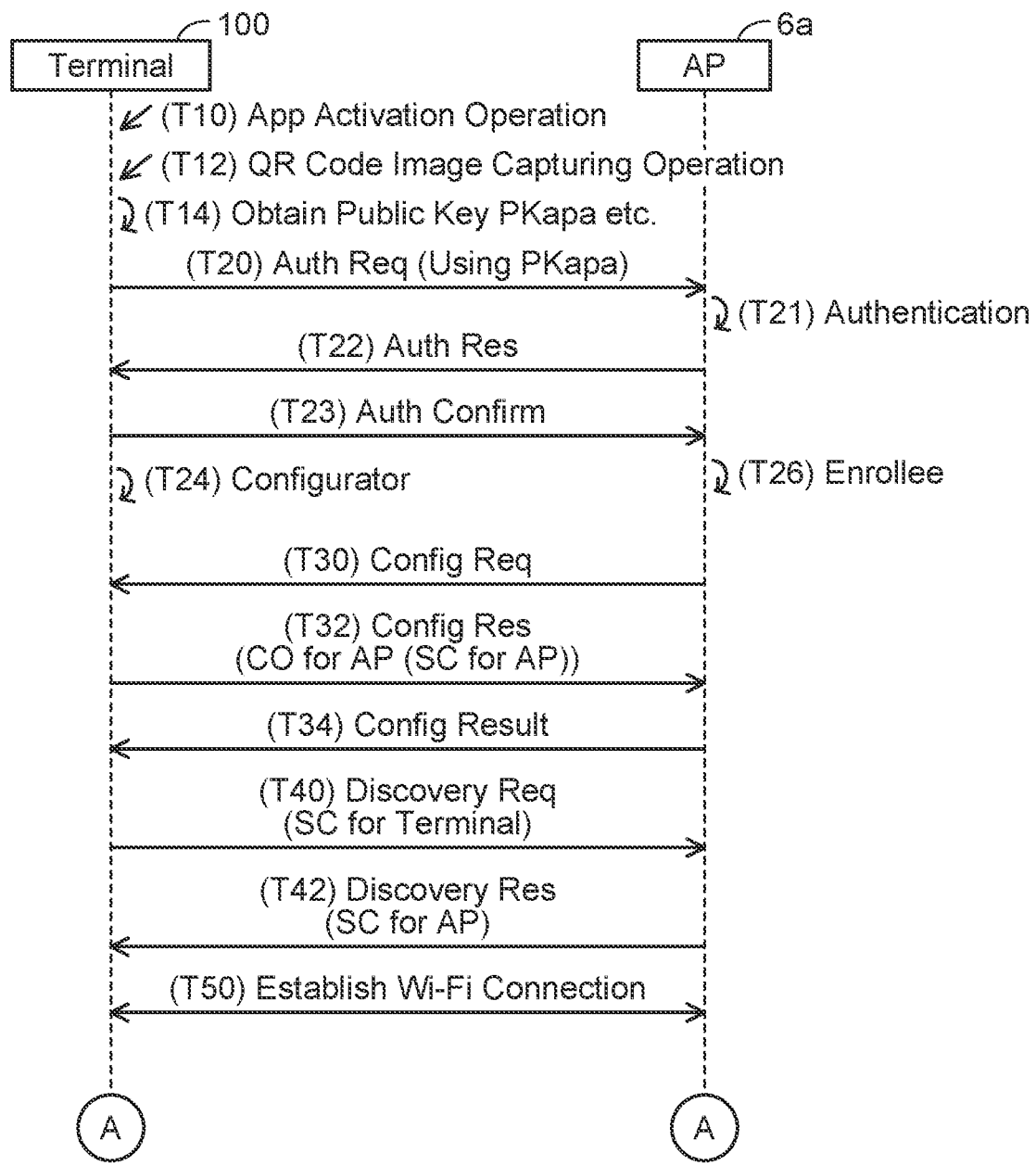
FIG. 2 is a sequence diagram of processes executed by devices.

(Establishment of Wi-Fi Connection Between Terminal 100 and AP 6a According to DPP Scheme; FIG. 2)

Next, with reference to FIG. 2, a process to establish a Wi-Fi connection between the terminal 100 and the AP 6a according to the DPP will be described. In the following descriptions in FIG. 2, for easier understanding, an action executed by CPUs of devices (e.g., the CPUs 32, 132) will be described with the devices (e.g., the printer 10, the terminal 100) as a subject of the action instead of describing the CPUs as the subject of the action. Further, all the communication executed by the printer 10 and the terminal 100 is executed via the Wi-Fi I/F 16 and the like. Accordingly, when communication is explained below, a phrase "via a Wi-Fi I/F" will be omitted. The same applies to explanations for FIG. 3 to FIG. 11.

In T10, the terminal 100 accepts an operation to activate the app 138 from the user. Consequently, the app 138 is activated and the camera 118 is activated.

In T12, the terminal 100 accepts an operation to capture the QR Code adhered to the housing of the AP 6a by using the camera 118 from the user. In this case, the terminal 100 decodes the captured QR Code in T14, by which the terminal 100 obtains the public key PKapa and the MAC address of the AP 6a. The processes of T12 and T14 correspond to the Bootstrapping of the DPP.

When the terminal 100 obtains the public key PKapa and the MAC address in T14, the terminal 100 sends an Authentication Request in which the public key PKapa is used to the AP 6a in T20 with the MAC address as a recipient. Hereafter, Authentication will be referred to as "Auth" and Request will be referred to as "Req".

The Auth Req is a signal requesting for authentication of the terminal 100 which is a sender. Specifically, the terminal 100 firstly creates a shared key by using a private key of the terminal 100 (illustration omitted) and the public key PKapa of the AP 6a and creates encrypted data by encrypting a random value by using the shared key. The terminal 100 then sends the Auth Req including a public key of the terminal 100 (illustration omitted), the encrypted data and Capability of the terminal 100 to the AP 6a. The Capability of the terminal 100 includes a value indicating that the terminal 100 can operate only as a Configurator of the DPP.

When the AP 6a receives the Auth Req from the terminal 100 in T20, the AP 6a executes authentication of the encrypted data included in the Auth Req in T21. Specifically, the AP 6a creates a shared key using the public key of the terminal 100 included in the Auth Req and a private key of the AP 6a and decrypts the encrypted data by using the shared key. When decryption of the encrypted data succeeds, the AP 6a determines that the authentication has succeeded and executes the processes from T22.

In T22, the AP 6a sends an Auth Response including a Capability of the AP 6a to the terminal 100. Hereafter, a Response will be referred to as "Res". The Capability of the AP 6a includes a value indicating that the AP 6a can operate only as an Enrollee of the DPP.

When the terminal 100 receives the Auth Res from the AP 6a in T22, the terminal 100 determines that the Capability of the AP 6a included in the Auth Res (i.e., Enrollee) is not in conflict with the Capability of the terminal 100 itself (i.e., Configurator). The terminal 100 then sends an Auth Confirm in T23. The Auth Confirm includes information indicating that the terminal 100 is to operate as the Configurator and the AP 6a is to operate as the Enrollee. Consequently, the terminal 100 determines to operate as the Configurator in T24. The Configurator is a device which plays a role to send a Configuration Object (hereafter referred to as "CO") to be described to the Enrollee.

In T26, the AP 6a determines to operate as the Enrollee. The Enrollee is a device which plays a role to receive the CO from the Configurator. The processes of T20 to T26 correspond to the Auth of the DPP.

In T30, the AP 6a sends a Configuration Req to the terminal 100. The Configuration will hereafter be referred to as "Config". The Config Req is a signal requesting for sending of the CO.

When the terminal 100 receives the Config Req from the AP 6a in T30, the terminal 100 creates the CO for AP. Specifically, the terminal 100 firstly creates a Signed Connector (hereafter referred to as "SC") for AP which is information to be used by the AP 6a for establishing a Wi-Fi connection. The SC for AP includes for example a group ID which is an identifier identifying a wireless network. The terminal 100 then creates the CO for AP including the SC for AP and sends the Config Res including the CO for AP to the AP 6a in T32.

When the AP 6a receives the Config Res from the terminal 100 in T32, the AP 6a sends a Config Result to the terminal 100 in T34. The Config Result includes information indicating that the Config has succeeded. The processes of T30 to T34 correspond to the Config of the DPP. Hereafter, the Bootstrapping, the Auth and the Config of the DPP may collectively be referred to as "DPP process".

Next, the terminal 100 creates an SC for terminal which is information to be used by the terminal 100 for establishing a Wi-Fi connection. The SC for terminal includes a group ID which is the same as the group ID included in the SC for AP. Then, in T40, the terminal 100 sends a Discovery Req including the SC for terminal to the AP 6a. The Discovery Req is a signal requesting for sending of a counterpart SC.

When the AP 6a receives the Discovery Req from the terminal 100 in T40, the AP 6a executes authentication of the SC for terminal included in the Discovery Req by using the SC for AP. When the authentication of the SC for terminal succeeds, the AP 6a creates a connection key. The AP6 then sends a Discovery Res including the SC for AP to the terminal 100 in T42.

When the terminal 100 receives the Discovery Res from the AP 6a in T42, the terminal 100 executes authentication of the SC for AP included in the Discovery Res by using the SC for terminal. When the authentication of the SC for AP succeeds, the terminal 100 creates a connection key. The connection key created at this point is the same as the connection key created by the AP 6a. In other words, the connection key is shared by the terminal 100 and the AP 6a. The processes of T40 and T42 correspond to the Network Access of the DPP.

Next, the terminal 100 executes 4way-handshake communication with the AP 6a by using the connection key. Consequently, in T50, a Wi-Fi connection between the terminal 100 and the AP 6a is established. As a result of this, a wireless network in which the AP 6a operates as a parent station is formed and the terminal 100 belongs to this wireless network as a child station.

Figure 3:
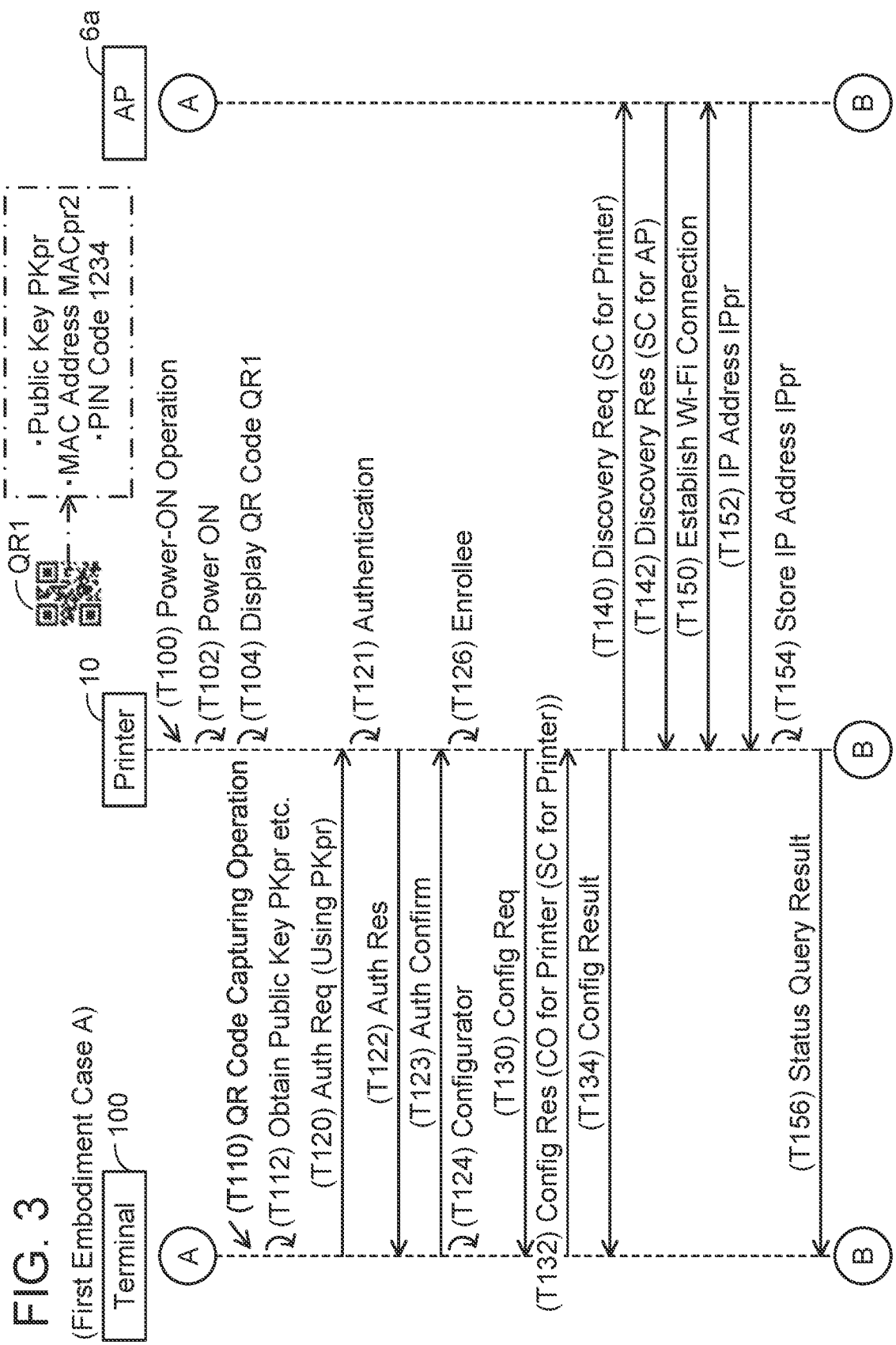
FIG. 3 is a sequence diagram of Case A.
Figure 4:
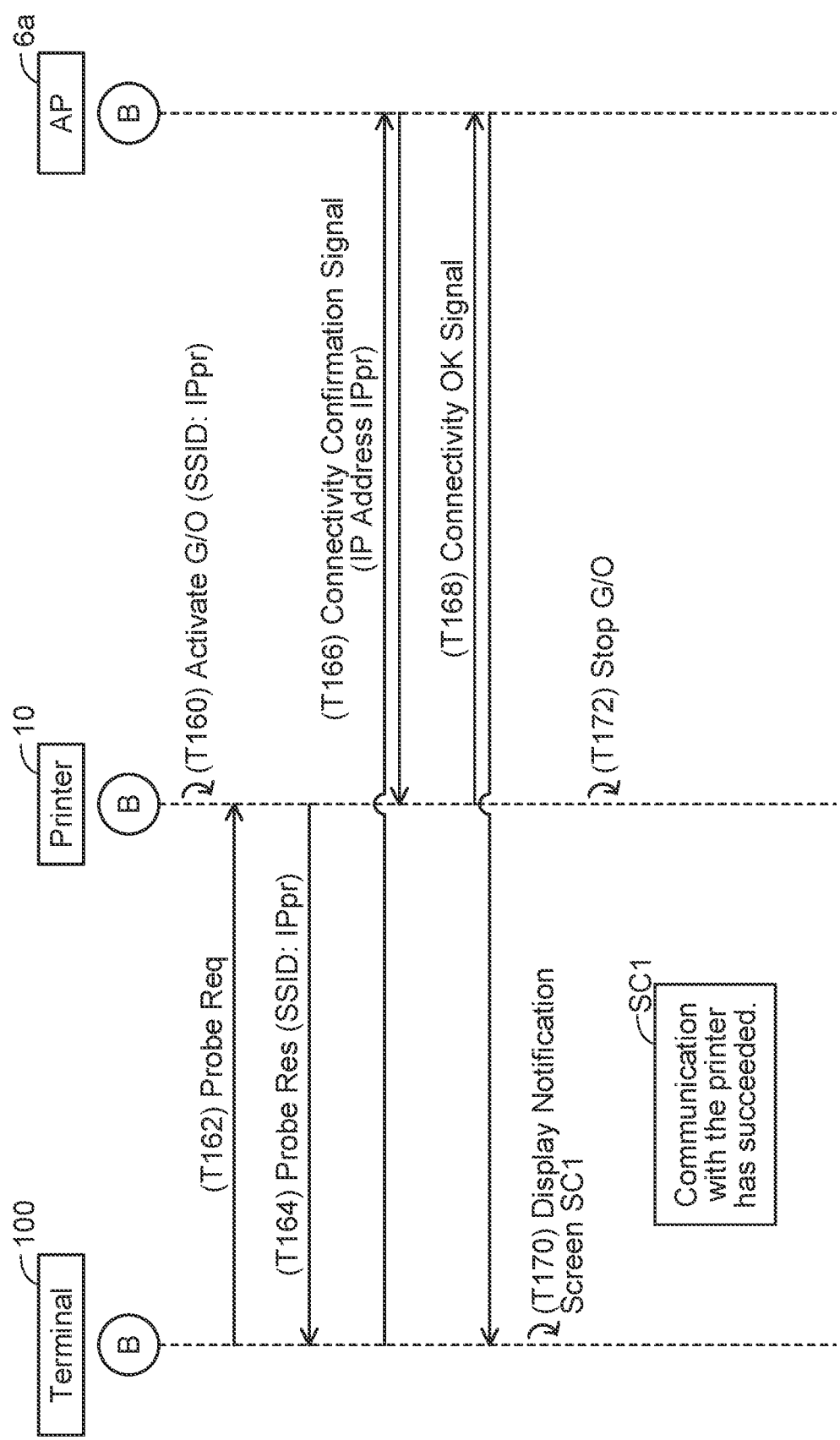
FIG. 4 is a sequence diagram continued from FIG. 3.

(Case A; FIG. 3 and FIG. 4)

Next, with reference to FIG. 3 and FIG. 4, Case A in which a Wi-Fi connection between the printer 10 and the AP 6a is established will be described. Case A is a case in which connectivity confirmation succeeds after the Wi-Fi connection between the printer 10 and the AP 6a is established. In the initial state of FIG. 3, the processes according to the DPP have already been executed between the terminal 100 and the AP 6a (see FIG. 2). As described above, the QR Code QR1 is adhered to the housing 50 of the printer 10.

When an operation to power on the printer 10 is executed by the user in T100, the printer 10 is powered on in T102. In this case, the printer 10 causes the display unit 14 to display the QR Code QR1 in T104. This QR Code QR1 is the same as the QR Code QR1 adhered to the housing 50 of the printer 10. In a modification, the process of T104 can be omitted.

In T110, the terminal 100 accepts an operation to capture the QR Code QR1 (i.e., the QR Code adhered to the housing 50 of the printer 10 or the QR Code displayed in T104) by using the camera 118 from the user. In this case, the terminal 100 decodes the QR Code QR1 in T112, by which the terminal 100 obtains the public key PKpr, the MAC address MACpr2 and the PIN code "1234".

The processes of T120 to T134 are the same as the processes of T20 to T34 of FIG. 2 except that the communication is executed between the printer 10 and the terminal 100 and information used in the communication (e.g., the public key PKpr and the MAC address MACpr2) is different. In T132, a CO for printer is communicated instead of the CO for AP. The processes of T140 to T150 are the same as the processes of T40 to T50 of FIG. 2 except that communication is executed between the printer 10 and the AP 6a and information used in the communication (e.g., an SC for printer) is different. Consequently, a Wi-Fi connection between the printer 10 and the AP 6a is established.

When the Wi-Fi connection between the printer 10 and the AP 6a is established, an IP address IPpr is assigned from the AP 6a to the printer 10. The printer 10 receives the IP address IPpr from the AP 6a in T152 and stores the received IP address IPpr in T154.

In T156, the printer 10 sends a Status Query Result (hereafter referred to as "Result") to the terminal 100. The Result includes information indicating that the Wi-Fi connection between the printer 10 and the AP 6a has been established.

(Continuation of FIG. 3; FIG. 4)

When the Wi-Fi connection is established in T150 of FIG. 3, the printer 10 shifts to the G/O state in T160 of FIG. 4. In the Wi-Fi network formed by the printer 10 which operates in the G/O state, the IP address IPpr assigned to the printer 10 (see T152, T154 of FIG. 3) is used as an SSID.

When the terminal 100 receives the Result from the printer 10 in T156 of FIG. 3, the terminal 100 broadcasts a Probe Req in T162 of FIG. 4. The Probe Req is a signal to search for device(s) around the terminal 100.

When the printer 10 receives the Probe Req from the terminal 100 in T162, the printer 10 sends a Probe Res to the terminal 100 in T164. The Probe Res includes the SSID "IPpr". As describes above, the printer 10 can send, to the terminal 100, the IP address IPpr assigned from the AP 6a.

When the terminal 100 receives the Probe Res from the printer 10 in T164, the terminal 100 sends a connectivity confirmation signal which includes the IP address IPpr which matches the received SSID "IPpr" as a recipient address in T166. Consequently, the connectivity confirmation signal is sent from the terminal 100 to the printer 10 via the AP 6a.

The printer 10 receives the connectivity confirmation signal from the terminal 100 via the AP 6a in T166. In this case, in T168, the printer 10 sends a connectivity OK signal indicating that the connectivity confirmation signal has been received to the terminal 100 via the AP 6a.

The terminal 100 receives the connectivity OK signal from the printer 10 via the AP 6a in T168. In this case, the terminal 100 causes the display unit 114 to display a notification screen SC1 in T170. The notification screen SC1 includes a message indicating that communication with the printer 10 via the AP 6a has succeeded. By viewing the notification screen SC1, the user can acknowledge that the terminal 100 and the printer 10 can communicate with each other via the AP 6a.

When a predetermined time elapses without the printer 10 receiving a WFD connection establishment request from the terminal 100 after the connectivity OK signal was sent to the terminal 100 in T168, the printer 10 stops the G/O state (i.e., the state in which the printer 10 operates as a parent station of the Wi-Fi network) in T172. Consequently, the printer 10 shifts to the state of not operating as a parent station of the Wi-Fi network and the Wi-Fi network formed by the printer 10 disappears. Thus, processing load on the printer 10 can be reduced.

(Case B; FIG. 5 and FIG. 6)

Next, with reference to FIG. 5 and FIG. 6, Case B in which a Wi-Fi connection between the printer 10 and the AP 6a is established will be described. Case B is a case in which the Wi-Fi connection between the printer 10 and the AP 6a is established but the connectivity confirmation fails. FIG. 5 is continuation of FIG. 3. In other words, in the initial state of FIG. 5, the Wi-Fi connection between the printer 10 and the Ap 6a is established.

The processes of T260 to T264 are the same as the processes of T160 to T164 of FIG. 4. In T266, the terminal 100 sends the connectivity confirmation signal including the IP address IPpr as a recipient address to the printer 10. In the present case, however, due to weak radio environment around the AP 6a, the AP 6a does not receive the connectivity confirmation signal. Consequently, the printer 10 does not receive the connectivity confirmation signal from the terminal 100.

Since the printer 10 does not receive the connectivity confirmation signal from the terminal 100, the printer 10 does not send the connectivity OK signal. Consequently, the terminal 100 does not receive the connectivity OK signal from the printer 10. When the terminal 100 does not receive the connectivity OK signal even after a predetermined time elapses since the connectivity confirmation signal was sent, the terminal 100 determines that the connectivity confirmation has failed and executes processes from T270. In a modification, a case in which the connectivity confirmation signal is suitably sent from the terminal 100 to the printer 10 but the connectivity OK signal is not sent from the printer 10 to the terminal 100 due to weak radio environment around the AP 6a is also contemplated. In this case as well, the terminal 100 determines that the connectivity confirmation has failed and executes the processes from T270.

In T270, the terminal 100 sends a WFD connection establishment request in which the obtained PIN code "1234" (see T112 of FIG. 3) is used to the printer 10. Consequently, in T272, a WFD connection between the terminal 100 and the printer 10 is established. Consequently, the terminal 100 and the printer 10 can send and receive an inquiry and a response to be described later by using this WFD connection.

In T274, the terminal 100 sends an inquiry to the printer 10 by using the established WFD connection. This inquiry is a signal requesting the printer 10 to send a response related to the connectivity confirmation.

When the printer 10 receives the inquiry from the terminal 100 in T274, the printer 10 sends a response to this inquiry to the terminal 100 in T276 by using the WFD connection. In the present case, the printer 10 has not received the connectivity confirmation signal, thus this response includes information indicating that the connectivity confirmation signal has not been received. As described above, when the connectivity confirmation fails, the terminal 100 can send the inquiry and receive the response by using the WFD connection. In the aforementioned modification in which the AP 6a does not receive the connectivity OK signal from the printer 10, the response includes information indicating that the connectivity confirmation signal has already been received and the connectivity OK signal has already been sent. Although the details will be described later, when the Wi-Fi I/F 16 of the printer 10 malfunctions, the response further includes information indicating malfunction of the Wi-Fi I/F 16.

When the terminal 100 receives the response from the printer 10 in T276, the terminal 100 analyses the information in the response. In the present case, the response includes the information indicating that the connectivity confirmation signal has not been received and does not include the information indicating malfunction of the Wi-Fi I/F 16. Thus, the terminal 100 determines that the Wi-Fi communication between the printer 10 and the terminal 100 via the AP 6a cannot be executed because of the AP 6a. In this case, the terminal 100 causes the display unit 114 to display a notification screen SC2 in T278. The notification screen SC2 includes a message indicating that communication with the printer 10 via the AP 6a has failed and a message indicating a method to connect to another AP (e.g., the AP 6b). By viewing the notification screen SC2, the user can acknowledge what sort of approach should be taken to execute the Wi-Fi communication with the printer 10 (i.e., to connect to the other AP).

(Continuation of FIG. 5; FIG. 6)

In T280 of FIG. 6, the terminal 100 accepts input of an SSID "S2" and a PW "P2" of the AP 6b from the user. In this case, the terminal 100 firstly disconnects the Wi-Fi connection with the AP 6a in T282. Next, the terminal 100 sends a Wi-Fi connection establishment request in which the SSID "S2" and the PW "P2" are used to the AP 6b in T284. Consequently, in T286, a Wi-Fi connection between the terminal 100 and the AP 6b is established. Next, in T290, the terminal 100 sends the SSID "S2" and the PW "P2" to the printer 10 by using the WFD connection (see T272 of FIG. 5).

When the printer 10 receives the SSID "S2" and the PW "P2" from the terminal 100 in T290, the printer 10 sends a Wi-Fi connection establishment request including the SSID "S2" and the PW "P2" to the AP 6b in T292. Consequently, in T294, a Wi-Fi connection between the printer 10 and the AP 6b is established. As a result of this, both the terminal 100 and the printer 10 belong to the Wi-Fi network formed by the AP 6b. Thus, the terminal 100 and the printer 10 can communicate with each other via the AP 6b.

When the printer 10 establishes the Wi-Fi connection with the AP 6b in T294, the printer 10 sends, to the terminal 100, an establishment notification indicating that the Wi-Fi connection with the AP 6b has been established by using the WFD connection in T296. Although the illustration is omitted, when the Wi-Fi connection between the printer 10 and the AP 6b is established in T294, an IP address is assigned to the printer 10 from the AP 6b. The establishment notification may include this IP address. Then, the terminal 100 may execute the connectivity confirmation (i.e., the same processes as T166 and T168 of FIG. 4) by using this IP address. When the terminal 100 receives the establishment notification from the printer 10 in T296, the terminal 100 sends a G/O stop instruction to the printer 10 by using the WFD connection in T298. Consequently, the printer 10 stops the G/O state in T299. Consequently, the Wi-Fi network formed by the printer 10 disappears. Thus, process load on the printer 10 can be reduced.

(Case C; FIG. 7)

Next, Case C will be described with reference to FIG. 7. In Case C, the cause of failure of the connectivity confirmation is different from Case B. Specifically, Case C is a case in which the connectivity confirmation fails due to malfunction of the Wi-Fi I/F 16 of the printer 10. FIG. 7 is continuation of FIG. 3. In other words, in the initial state of FIG. 7, the Wi-Fi connection between the printer 10 and the AP 6a is established. The processes of T360 to T374 are the same as the processes of T260 to T274 of FIG. 5.

When the printer 10 receives the inquiry from the terminal 100 in T374, the printer 10 sends a response to this inquiry to the terminal 100 in T376 by using the WFD connection. In the present case, the printer 10 has not received the connectivity confirmation signal, thus the response includes information indicating that the connectivity confirmation signal has not been received yet. Moreover, since the Wi-Fi I/F 16 of the printer 10 malfunctions, this response further includes the information indicating malfunction of the Wi-Fi I/F 16. In a modification, this response may include only the information indicating malfunction of the Wi-Fi I/F 16. The processes of T380 and T382 are the same as the processes of T298 and T299 of FIG. 6.

When the terminal 100 receives the response from the printer 10 in T376, the terminal 100 analyses the information in the response. In the present case, the response includes the information indicating malfunction of the Wi-fi I/F 16. Thus, the terminal 100 determines that the Wi-Fi communication between the printer 10 and the terminal 100 via the AP 6*a* cannot be executed because of the Wi-Fi I/F 16 of the printer 10. In this case, in T384, the terminal 100 causes the display unit 114 to display a notification screen SC3. The notification screen SC3 includes a message indicating that communication with the printer 10 via the AP 6*a* has failed and a message indicating that the user needs to contact a support center. The user can acknowledge what sort of approach should be taken to execute Wi-Fi communication with the printer 10 (i.e., contact the support center) by viewing the notification screen SC3.

(Case D; FIG. 8)

Next, with reference to FIG. 8, Case D will be described. Case D is a case in which the DPP process between the terminal 100 and the printer 10 fails. The initial state of FIG. 8 is the same as the initial state of FIG. 3. The processes of T400 to T421 are the same as the processes of T100 to T121 of FIG. 3.

In T420, the terminal 100 sends, to the printer 10, the Auth Req including a value indicating that the terminal 100 can operate only as the Configurator of the DPP (see T20 of FIG. 2). In the present Case, also the printer 10 can operate only as the Configurator. Thus, the printer 10 determines that the roles of the printer 10 and the terminal 100 are in conflict, and sends the Auth Res including a code "STATUS_NOT_COMPATIBLE" to the terminal 100 in T422. This code is a code indicating that the roles are in conflict. In other words, in the present case, the DPP process between the terminal 100 and the printer 10 fails due to failure in role assignment between the terminal 100 and the printer 10.

When the printer 10 sends the Auth Res to the terminal 100 in T422 (i.e., when the DPP process fails), the printer 10 shifts to the G/O state in T430. In the Wi-Fi network formed by the printer 10 which operates in the G/O state, a character string matching the above code "STATUS_NOT_COMPATIBLE" is used as an SSID.

When the terminal 100 receives the Auth Res from the printer 10 in T422, (i.e., when the DPP process fails), the terminal 100 broadcasts the Probe Req in T432.

When the printer 10 receives the Probe Req from the terminal 100 in T432, the printer 10 sends the Probe Res to the terminal 100 in T434. The Probe Res includes the SSID "STATUS_NOT_COMPATIBLE". As described above, since the printer 10 sends the Probe Res including the code "STATUS_NOT_COMPATIBLE" to the terminal 100, the printer 10 can send, to the terminal 100, information indicating that the DPP process has failed.

When the terminal 100 receives the Probe Res from the printer 10 in T434, the terminal 100 sends the G/O stop instruction to the printer 10 in T436. Consequently, the printer 10 stops the G/O state in T438. Consequently, the Wi-Fi network formed by the printer 10 disappears. Thus, process load on the printer 10 can be reduced.

When the terminal 100 receives the Probe Res from the printer 10 in T434, the terminal 100 causes the display unit 114 to display a notification screen SC4 in T440. The notification screen SC4 includes a message indicating that the DPP process with the printer 10 has failed and the code "STATUS_NOT_COMPATIBLE" included in the Probe Res. By viewing the notification screen SC4, the user can acknowledge that the DPP process with the printer 10 has failed, and the cause of the failure (i.e., conflict in roles).

Effects of First Embodiment

According to the above configuration, when the Wi-Fi connection between the printer 10 and the AP 6*a* is established (see T150 of FIG. 3), the printer 10 sends, to the terminal 100, the Probe Res including the IP address IPpr of the printer 10 as the SSID (T164 of FIG. 4). Consequently, the terminal 100 can execute the connectivity confirmation by using the IP address IPpr. Thus, user convenience is enhanced.

(Corresponding Relationships)

The printer 10, the terminal 100, the AP 6*a* and the AP 6*b* are an example of "communication device", "terminal device", "first access point (and access point)" and "second access point", respectively. The display unit 14 of the printer 10 is an example of "output unit". The Wi-Fi I/F 16 and the Wi-Fi I/F 116 are an example of "Wi-Fi interface" of "communication device" and "Wi-Fi interface" of "terminal device", respectively. The public key PKpr of the printer 10 and the PIN code "1234" are an example of "bootstrapping key" and "authentication information", respectively. The QR Codes QR1 is an example of "outputted information (and code image)".

The Auth Req and the Auth Res are an example of "authentication request" and "authentication response", respectively. The Probe Req and the Probe Res are an example of "Probe request" and "Probe response", respectively. The CO for printer is an example of "first connection information". The SSID "S2" and the PW "P2" of the AP 6*b* are an example of "second connection information". The IP address IPpr is an example of "confirmation information". The code "STATUS_NOT_COMPATIBLE" is an example of "error information". The G/O state and the state of not operating as the parent station of the Wi-Fi network are an example of "parent state" and "non-parent state", respectively. The SSID used when the printer 10 operates in the G/O state is an example of "network identification information". The Wi-Fi connection established in T150 of FIG. 3 and the WFD connection established in T272 of FIG. 5 are an example of "first Wi-Fi connection" and "second Wi-Fi connection", respectively. The WFD connection establishment request of T270 of FIG. 5 is an example of "establishment request". The G/O stop instruction sent in T298 of FIG. 6 is an example of "parent state stop instruction". The message indicating an approach to connect to another AP (e.g., the AP 6*b*) included in the notification screen SC2 is an example of "approach information".

The process of T104 of FIG. 3 is an example of "cause the output unit to output information" executed by "communication device". The processes of T120 to T132 of FIG. 3 are examples of "execute a Device Provisioning Protocol (DPP) process" executed by "communication device". In particular, the process of T120, the process of T122 and the process of T132 are an example of "receiving an authentication request", "sending an authentication response to the terminal device" and "receiving first connection information" executed by "communication device", respectively. The process of T160 of FIG. 4 (and the process of T430 of FIG. 8), the process of T164 and the process of T172 are an example of "in the case where the first Wi-Fi connection between the communication device and the first access point is established, shift a state of the communication device from a non-parent state to a parent state", "send confirmation information" and "in a case where a predetermined time elapses without the establishment request being received from the terminal device after the connectivity confirmation signal has been received from the terminal device via the Wi-Fi interface, shift the state of the communication device from the parent state to the non-parent state" executed by "communication device", respectively. The process of T270, the process of T272, the process of T274 and the process of T276 of FIG. 5 are an example of "in a case where the connectivity confirmation fails at the terminal device, receive an establishment request", "establish a second Wi-Fi connection", "receive an inquiry" and "send a response" executed by "communication device", respectively. The process of T290 and the process of T299 of FIG. 6 are an example of "receive second connection information" and "in a case where a parent state stop instruction is received from the terminal device via the Wi-Fi interface by using the second Wi-Fi connection, shift the state of the communication device from the parent state to the non-parent state" executed by "communication device", respectively. The process of T434 of FIG. 8 is an example of "send error information" executed by "communication device".

The processes of T120 to T132 of FIG. 3 are examples of "execute a Device Provisioning Protocol (DPP) process" executed by "application program". In particular, the process of T120, the process of T122 and the process of T132 are examples of "sending an authentication request", "receiving an authentication response" and "sending connection information" executed by "application program", respectively. The process of T162 and the process of T164 are an example of "send a Probe request" and "receive confirmation information" executed by "application program", respectively. The processes of T166 and T168 of FIG. 4 are example of "execute the connectivity confirmation" executed by "application program". The process of T270, the process of T272, the process of T274, the process of T276 and the process of T278 of FIG. 5 are an example of "in a case where the connectivity confirmation fails, send an establishment request", "establish a second Wi-Fi connection", "send an inquiry", "receive a response" and "cause a display unit of the terminal device to display approach information" executed by "application program", respectively.

Second Embodiment

Next, Second Embodiment will be described. The second embodiment is different from the first embodiment in its method to send the IP address IPpr of the printer 10 (or the code "STATUS_NOT_COMPATIBLE") to the terminal 100. In the second embodiment, the QR Code adhered to the housing 50 of the printer 10 is a QR Code QR2. The QR Code QR2 is a code image obtained by coding respective pieces of information included in the QR Code QR1 (i.e., the public key PKpr, the MAC address MAC pr2 and the PIN code "1234") and a predetermined SSID "S3". The SSID "S3" is an SSID used in the Wi-Fi network formed by the printer 10 which operates in the G/O state.

(Case E; FIG. 9)

Case E will firstly be described with reference to FIG. 9. Case E is a case in which the connectivity confirmation succeeds. FIG. 9 is continuation of FIG. 3. In other words, in the initial state of FIG. 9, the Wi-Fi connection is established between the printer 10 and the AP 6*a*. In T104 of FIG. 3 before FIG. 9, the QR Code QR2 is displayed instead of the QR Code QR1.

The processes of T560 to T564 are the same as the processes of T160 to T164 of FIG. 4 except that the SSID to be used is "S3". The processes of T570 and T572 are the same as the processes of T270 and T272 of FIG. 5.

In T574, the terminal 100 sends a DPP success confirmation to the printer 10 by using the WFD connection.

Since the DPP process between the terminal 100 and the printer 10 has already succeeded, when the printer 10 receives the DPP success confirmation from the terminal 100 in T574, the printer 10 sends a signal indicating that the DPP process has succeeded to the terminal 100 by using the WFD connection in T576. This signal includes the IP address IPpr of the printer 10. As described above, the printer 10 can send, to the terminal 100, the IP address IPpr assigned by the AP 6*a*.

When the terminal 100 receives the signal including the IP address IPpr from the printer 10 in T576, the terminal 100 sends a connectivity confirmation signal including the received IP address IPpr as a recipient address in T580. The processes of T580 and T582 are the same as the processes of T166 and T168 of FIG. 4. The processes of T584 and T586 are the same as the processes of T298 and T299 of FIG. 6. The process of T588 is the same as the process of T170 of FIG. 4. As with Case A of the first embodiment, the user can acknowledge that the terminal 100 and the printer 10 can communicate with each other via the AP 6*a* by viewing the notification screen SC1.

(Case F; FIG. 10)

Next, Case F will be described with reference to FIG. 10. Case F is a case in which the Wi-Fi connection between the printer 10 and the AP 6*a* is established but the connectivity confirmation fails. The initial state of FIG. 10 is the same as the initial state of FIG. 9. In Case F, the same processes as the processes of T560 to T576 of FIG. 9 are executed.

In T678, the terminal 100 sends, to the printer 10, the connectivity confirmation signal including the IP address IPpr of the printer 10 as a recipient address. In the present case, however, the AP 6*a* does not receive the connectivity confirmation signal because of the weak radio environment around the AP 6*a*. Consequently, the printer 10 does not receive the connectivity confirmation signal from the terminal 100. In other words, in the present case, the terminal 100 does not receive the connectivity OK signal even when a predetermined time elapses from when the connectivity confirmation signal was sent, thus the terminal 100 determines that the connectivity confirmation has failed.

The processes of T684 to T688 are the same as the processes of T274 to T278 of FIG. 5. Consequently, the user can acknowledge what sort of approach should be taken to execute the Wi-Fi communication with the printer 10 (i.e., connect with another AP) by viewing the notification screen SC2. Thereafter, the processes as in FIG. 6 are executed, by which the terminal 100 and the printer 10 can communicate with each other via the AP 6*b*.

(Case G; FIG. 11)

Next, Case G will be described with reference to FIG. 11. Case G is a case in which the DPP process between the terminal 100 and the printer 10 fails. The initial state of FIG. 11 is the same as the initial state of FIG. 8 except that the QR Code adhered to the housing of the printer 10 is QR2.

In Case G, the same processes as the processes of T400 to T422 of FIG. 8 are firstly executed. In other words, in Case G as well, the DPP process between the terminal 100 and the printer 10 fails. The processes of T760 to T764 are the same as the processes of T430 to T434 of FIG. 8 except that the SSID to be used is "S3". The processes of T770 to T774 are the same as the processes of T570 to T574 of FIG. 9.

Since the DPP process between the terminal 100 and the printer 10 has failed (see FIG. 8), when the printer 10 receives the DPP success confirmation from the terminal 100 in T774, the printer 10 sends, to the terminal 100, a signal indicating that the DPP process has failed in T776 by using the established WFD connection. This signal includes the code "STATUS_NOT_COMPATIBLE" (see T422 of FIG. 8). As described above, the printer 10 can send the information indicating that the DPP process has failed to the terminal 100. The processes of T778 to T780 are the same as the processes of T436 to T440 of FIG. 8. In the present case as well, the user can acknowledge that the DPP process with the printer 10 has failed and the cause of the failure (i.e., conflict in roles) by viewing the notification screen SC4.

Effects of Second Embodiment

According to the above configuration, when the Wi-Fi connection between the printer 10 and the AP 6a is established (see T150 of FIG. 3), the printer 10 sends the signal including the IP address IPpr of the printer 10 to the terminal 100 (T576 of FIG. 9). Consequently, the terminal 100 can execute the connectivity confirmation by using the IP address IPpr. Thus, user convenience is enhanced.
(Corresponding Relationships)

The process of T560, the process of T570, the process of T572 (and the process of T772 of FIG. 11), the process of T576 and the process of T586 of FIG. 9 are an example of "in the case where the first Wi-Fi connection between the communication device and the first access point is established, shift a state of the communication device from a non-parent state to a parent state", "after the state of the communication device has been shifted to the parent state, receive an establishment request", "establish a second Wi-Fi connection", "send confirmation information", and "in a case where a parent state stop instruction is received from the terminal device via the Wi-Fi interface by using the second Wi-Fi connection, shift the state of the communication device from the parent state to the non-parent state" executed by "communication device", respectively. The process of T684 of FIG. 10 and the process of T686 of FIG. 10 are an example of "receive an inquiry" and "send a response" executed by "communication device", respectively. The process of T760, the process of T770 and the process of T776 of FIG. 11 are an example of "in the case where the DPP process fails, shift a state of the communication device from a non-parent state to a parent state", "in a case where the state of the communication device is shifted to the parent state, receive an establishment request" and "send error information", respectively.

The process of T570, the process of T572, the process of T576 and the processes of T580 and T582 of FIG. 9 are an example of "in a case where the first Wi-Fi connection between the communication device and the access point is established, send an establishment request", "establish a second Wi-Fi connection", "receive confirmation information" and "execute the connectivity confirmation" executed by "application program", respectively. The process of T684, the process of T686 and the process of T688 of FIG. 10 are an example of "send an inquiry", "receive a response", "cause a display unit of the terminal device to display approach information" executed by "application program", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) In T160 of FIG. 4, the printer 10 may shift to the G/O state, and in the Wi-Fi network formed by the printer 10 which operates in the G/O state, a Universally Unique Identifier (UUID) of the printer 10 may be used as an SSID. In this case, in T164, the printer 10 may send the Probe Res including the UUID to the terminal 100. Then, the terminal 100 may execute the connectivity confirmation by using this UUID. In the present modification, the UUID of the printer 10 is an example of "confirmation information".

(Modification 2) A timing at which the process of T160 of FIG. 4 is executed is not limited to the aspect of the embodiment. For example, the printer 10 may shift to the G/O state before sending the Status Query Result to the terminal 100 (see T156 of FIG. 3). In other words, the timing at which the process of T160 is executed only needs to be after the IP address IPpr is stored in the printer 10 (i.e., after T154 of FIG. 3). Moreover, the timing at which the process of T560 of FIG. 9 is executed only needs to be after the Wi-Fi connection between the printer 10 and the AP 6a is established (i.e., after T150 of FIG. 3).

(Modification 3) In T160, the printer 10 may activate the SoftAP instead of shifting to the G/O state. In this case, the IP address IPpr assigned to the printer 10 may be used as an SSID identifying a wireless network formed by the SoftAP.

(Modification 4) The terminal 100 can omit the processes from T270 of FIG. 5. In other words, the terminal 100 may not send the inquiry to the printer 10 when the connectivity confirmation fails. In this case, the terminal 100 may cause the display unit 14 to display a screen including only a message indicating that the communication with the printer 10 via the AP 6a has failed. In the present modification, "receive an inquiry", "send a response" and "receive second connection information" executed by "communication device" can be omitted. Further, "send an inquiry", "receive a response" and "cause a display unit of the terminal device to display approach information" executed by "application program" can be omitted.

(Modification 5) The terminal 100 can omit the processes of T298 and T299 of FIG. 6. In the present modification, "in a case where a parent state stop instruction is received from the terminal device via the Wi-Fi interface by using the second Wi-Fi connection, shift the state of the communication device from the parent state to the non-parent state" executed by "communication device" can be omitted. In another modification, instead of the process of T298, the printer 10 may execute the process of T299 when the printer 10 directly obtains the G/O stop instruction from the user via the operation unit 12 of the printer 10.

(Modification 6) In T104 of FIG. 3, the printer 10 may cause the print executing unit 18 to print the QR Code QR1. In the present modification, the print executing unit 18 is an example of "output unit" and printing of the QR Code QR1 is an example of "cause the output unit to output information" executed by "communication device". In another modification, in T104, the printer 10 may supply the public key PKpr, the MAC address MACpr2 and the PIN Code to a Near Field Communication (NFC) I/F (illustration omitted). In this case, the terminal 100 may obtain information such as the public key PKpr via NFC communication in response to the terminal 100 being brought closer to the printer 10. In the present modification, the information such as the public key PKpr is an example of "outputted information", the NFC I/F is an example of "output unit", and supply of the public key PKpr and the like to the NFC I/F is an example of "cause the output unit to output information" executed by "communication device". In another modification, in T104, the printer 10 may supply the public key PKpr, the MAC address MACpr2 and the PIN Code to a Bluetooth (BT) I/F (illustration omitted). Bluetooth is a registered trademark of Bluetooth SIG. In this case, the terminal 100 may obtain the information such as the public key PKpr via BT communication. In the present modification, the BT I/F is an example of "output unit", supply of the public key PKpr and the like to the BT I/F is an example of "cause the output unit to output information" executed by "communication device".

(Modification 7) The QR Code QR1 may be a code image obtained by coding information not including the PIN Code "1234". In this case, the user may obtain the PIN code "1234" from the printer 10 by a method other than capturing of the QR Code QR1. In another modification, the PIN code "1234" may not be used to establish the WFD connection between the terminal 100 and the printer 10. In this case, the printer 10 may not store the PIN code "1234".

(Modification 8) The terminal 100 and the printer 10 may omit the processes from T430 of FIG. 8. In the present modification, "send error information" executed by "communication device" can be omitted. In the above embodiment, the code "STATUS_NOT_COMPATIBLE" was sent in response to the failure of the role assignment in the DPP process, however, when the DPP process fails due to a different cause in the DPP process, the printer 10 may send a code indicating the cause to the terminal 100. In the present modification, the code indicating the cause is an example of "error information".

(Modification 9) In the above embodiments, the processes of FIGS. 2 to 11 are implemented by a software such as the program 36, however, at least one of these processes may be implemented by hardware such as a logic circuit.

What is claimed is:

1. A communication device, comprising:
a Wi-Fi interface configured to execute Wi-Fi communication according to a Wi-Fi standard; and
a controller, wherein
the controller is configured to:
execute a Device Provisioning Protocol (DPP) process according to the DPP of the Wi-Fi standard, wherein the DPP process comprises:
receiving an authentication request in which a bootstrapping key of the communication device is used from a terminal device via the Wi-Fi interface;
in a case where the authentication request is received from the terminal device, sending an authentication response to the terminal device via the Wi-Fi interface; and
after the authentication response has been sent to the terminal device, receiving first connection information from the terminal device via the Wi-Fi interface, wherein the first connection information is used by the communication device for establishing a first Wi-Fi connection between the communication device and a first access point via the Wi-Fi interface, and
in a case where the first Wi-Fi connection between the communication device and the first access point is established, send confirmation information to the terminal device via the Wi-Fi interface, wherein the confirmation information is used by the terminal device for executing connectivity confirmation to confirm whether the Wi-Fi communication between the communication device and the terminal device via the first access point is executable.

2. The communication device as in claim 1, wherein the controller is further configured to:
in the case where the first Wi-Fi connection between the communication device and the first access point is established, shift a state of the communication device from a non-parent state to a parent state, wherein the non-parent state is a state in which the communication device does not operate as a parent station of a wireless network, the parent state is a state in which the communication device operates as the parent station of the wireless network, and network identification information for identifying the wireless network includes the confirmation information,
wherein in a case where a Probe request is received from the terminal device via the Wi-Fi interface, the controller is configured to send the confirmation information to the terminal device by sending, to the terminal device, a Probe response including the network identification information via the Wi-Fi interface.

3. The communication device as in claim 2, wherein the controller is further configured to:
in a case where the connectivity confirmation fails at the terminal device, receive an establishment request from the terminal device via the Wi-Fi interface; and
in a case where the establishment request is received from the terminal device, establish a second Wi-Fi connection between the communication device and the terminal device via the Wi-Fi interface so as to join the terminal device to the wireless network as a child station.

4. The communication device as in claim 3, wherein the connectivity confirmation includes a connectivity confirmation signal being sent from the terminal device to the communication device via the first access point, wherein
the controller is further configured to:
in a case where a predetermined time elapses without the establishment request being received from the terminal device after the connectivity confirmation signal has been received from the terminal device via the Wi-Fi interface, shift the state of the communication device from the parent state to the non-parent state.

5. The communication device as in claim 3, wherein the controller is further configured to:
in the case where the connectivity confirmation fails at the terminal device, receive an inquiry related to the connectivity confirmation from the terminal device via the Wi-Fi interface by using the second Wi-Fi connection, and
in a case where the inquiry is received from the terminal device, send a response to the inquiry to the terminal device via the Wi-Fi interface by using the second Wi-Fi connection.

6. The communication device as in claim 3, wherein the controller is further configured to:
in the case where the connectivity confirmation fails at the terminal device, receive second connection information according to a scheme different from the DPP from the terminal device via the Wi-Fi interface by using the second Wi-Fi connection, wherein the second connection information is used by the communication device for establishing a third Wi-Fi connection between the communication device and a second access point different from the first access point via the Wi-Fi interface.

7. The communication device as in claim 3, wherein the controller is further configured to:
in a case where a parent state stop instruction is received from the terminal device via the Wi-Fi interface by using the second Wi-Fi connection, shift the state of the communication device from the parent state to the non-parent state.

8. The communication device as in claim 3, further comprising an output unit, wherein
the controller is further configured to:
cause the output unit to output information obtained by using the bootstrapping key and authentication information, wherein in response to the outputted information being obtained by the terminal device, the authentication request is received from the terminal device, and
the authentication information is information for the terminal device to establish the second Wi-Fi connection with the communication device.

9. The communication device as in claim 3, further comprising:
a housing to which a code image obtained by coding the bootstrapping key and authentication information is adhered, wherein in response to the code image being captured by the terminal device, the authentication request is received from the terminal device,
wherein the authentication information is information for the terminal device to establish the second Wi-Fi connection with the communication device.

10. The communication device as in claim 1, wherein the controller is further configured to:
in the case where the first Wi-Fi connection between the communication device and the first access point is established, shift a state of the communication device from a non-parent state to a parent state, wherein the non-parent state is a state in which the communication device does not operate as a parent station of a wireless network, and the parent state is a state in which the communication device operates as the parent station of the wireless network;
after the state of the communication device has been shifted to the parent state, receive an establishment request from the terminal device via the Wi-Fi interface; and
in a case where the establishment request is received from the terminal device, establish a second Wi-Fi connection between the communication device and the terminal device via the Wi-Fi interface so as to join the terminal device to the wireless network as a child station,
wherein the controller is configured to send the confirmation information to the terminal device via the Wi-Fi interface by using the second Wi-Fi connection.

11. The communication device as in claim 1, wherein the confirmation information is an IP address of the communication device assigned by the first access point.

12. The communication device as in claim 1, wherein the controller is further configured to:
in a case where the DPP process fails, send error information indicating the DPP process has failed to the terminal device via the Wi-Fi interface.

13. The communication device as in claim 12, wherein the controller is further configured to:
in the case where the DPP process fails, shift a state of the communication device from a non-parent state to a parent state, wherein the non-parent state is a state in which the communication device does not operate as a parent station of a wireless network and the parent state is a state in which the communication device operates as the parent station of the wireless network, and network identification information identifying the wireless network includes the error information,
wherein in a case where a Probe request is received from the terminal device via the Wi-Fi interface, the controller is configured to send the error information to the terminal device by sending, to the terminal device, a Probe response including the network identification information via the Wi-Fi interface.

14. The communication device as in claim 12, wherein the controller is further configured to:
in the case where the DPP process fails, shift a state of the communication device from a non-parent state to a parent state, wherein the non-parent state is a state in which the communication device does not operate as a parent station of a wireless network and the parent state is a state in which the communication device operates as the parent station of the wireless network;
in a case where the state of the communication device is shifted to the parent state, receive an establishment request from the terminal device via the Wi-Fi interface; and
in a case where the establishment request is received from the terminal device, establish a second Wi-Fi connection between the communication device and the terminal device via the Wi-Fi interface so as to join the terminal device to the wireless network as a child station,
wherein the controller is configured to send the error information to the terminal device via the Wi-Fi interface by using the second Wi-Fi connection.

15. A non-transitory computer-readable recording medium storing computer-readable instructions for a communication device,
the communication device comprises:
a Wi-Fi interface configured to execute Wi-Fi communication according to a Wi-Fi standard; and
a processor,
wherein the computer-readable instructions, when executed by the processor, causing the communication device to:
execute a Device Provisioning Protocol (DPP) process according to the DPP of the Wi-Fi standard, wherein the DPP process comprises:
receiving an authentication request in which a bootstrapping key of the communication device is used from a terminal device via the Wi-Fi interface;
in a case where the authentication request is received from the terminal device, sending an authentication response to the terminal device via the Wi-Fi interface; and after the authentication response has been sent to the terminal device, receiving first connection information from the terminal device via the Wi-Fi interface, wherein the first connection information is used by the communication device for establishing a first Wi-Fi connection between the communication device and a first access point via the Wi-Fi interface, and in a case where the first Wi-Fi connection between the communication device and the first access point is established, send confirmation information to the terminal device via the Wi-Fi interface, wherein the confirmation information is used by the terminal device for executing connectivity confirmation to confirm whether the Wi-Fi communication between the communication device and the terminal device via the first access point is executable.

16. A non-transitory computer-readable recording medium storing an application program including computer-readable instructions for a terminal device, the terminal device comprises:
a Wi-Fi interface configured to execute Wi-Fi communication according to a Wi-Fi standard; and
a processer,
wherein the computer-readable instructions, when executed by the processor, causing the terminal device to:
execute a Device Provisioning Protocol (DPP) process according to the DPP of the Wi-Fi standard, wherein the DPP process comprises:
sending an authentication request in which a bootstrapping key of a communication device is used to the communication device via the Wi-Fi interface;
in a case where the authentication request is sent to the communication device, receiving an authentication response from the communication device via the Wi-Fi interface; and
after the authentication response has been received from the communication device, sending connection information to the communication device via the Wi-Fi interface, wherein the connection information is used by the communication device for establishing a first Wi-Fi connection between the communication device and an access point via the Wi-Fi interface,
in a case where the first Wi-Fi connection between the communication device and the access point is established, receive confirmation information from the communication device via the Wi-Fi interface, wherein the confirmation information is used by the terminal device for executing connectivity confirmation to confirm whether the Wi-Fi communication between the communication device and the terminal device via the access point is executable; and
in a case where the confirmation information is received from the communication device, execute the connectivity confirmation by using the confirmation information.

17. The non-transitory computer-readable recording medium as in claim 16, wherein
the computer-readable instructions, when executed by the processor, further cause the terminal device to:
in the case where the first Wi-Fi connection between the communication device and the access point is established, send a Probe request to the communication device via the Wi-Fi interface,
wherein the confirmation information is received from the communication device by receiving, from the communication device operating as a parent station of a wireless network, a Probe response including network identification information including the confirmation information via the Wi-Fi interface, the network identification information being for identifying the wireless network.

18. The non-transitory computer-readable recording medium as in claim 17, wherein
the computer-readable instructions, when executed by the processor, further cause the terminal device to:
in a case where the connectivity confirmation fails, send an establishment request to the communication device via the Wi-Fi interface; and
in a case where the establishment request is sent to the communication device, establish a second Wi-Fi connection between the communication device operating as the parent station of the wireless network and the terminal device via the Wi-Fi interface so as to join the wireless network as a child station.

19. The non-transitory computer-readable recording medium as in claim 16, wherein
the computer-readable instructions, when executed by the processor, further cause the terminal device to:
in a case where the first Wi-Fi connection between the communication device and the access point is established, send an establishment request to the communication device via the Wi-Fi interface; and
in a case where the establishment request is sent to the communication device, establish a second Wi-Fi connection between the communication device operating as a parent station of a wireless network and the terminal device via the Wi-Fi interface so as to join the wireless network as a child station,
wherein the confirmation information is received from the communication device via the Wi-Fi interface by using the second Wi-Fi connection.

20. The non-transitory computer-readable recording medium as in claim 18, wherein
the computer-readable instructions, when executed by the processor, further cause the terminal device to:
in a case where the connectivity confirmation fails, send an inquiry related to the connectivity confirmation to the communication device via the Wi-Fi interface by using the second Wi-Fi connection;
in a case where the inquiry is sent to the communication device, receive a response to the inquiry from the communication device via the Wi-Fi interface by using the second Wi-Fi connection; and
in a case where the response is received from the communication device, cause a display unit of the terminal device to display approach information according to the response.

* * * * *